United States Patent [19]

Prieto

[11] 3,856,576

[45] Dec. 24, 1974

[54] PROCESS OF TREATING ELECTROLYTIC MANGANESE DIOXIDE

[75] Inventor: Martin Angel Prieto, Diamond Bar, Calif.

[73] Assignee: Kerr-McGee Chemical Corp., Oklahoma City, Okla.

[22] Filed: June 25, 1973

[21] Appl. No.: 373,431

[52] U.S. Cl. .............................. 136/139, 136/139
[51] Int. Cl. ............................................ C01g 45/02
[58] Field of Search .................... 423/605; 136/139

[56] References Cited
UNITED STATES PATENTS

| | | | |
|---|---|---|---|
| 2,215,530 | 9/1940 | Nossen | 136/139 |
| 2,667,405 | 1/1954 | Muller et al. | 136/139 X |
| 2,956,860 | 10/1960 | Welsh | 423/605 |
| 3,065,155 | 11/1962 | Welsh | 136/139 X |
| 3,356,452 | 12/1967 | Moore | 136/139 X |

FOREIGN PATENTS OR APPLICATIONS

| | | | |
|---|---|---|---|
| 540,001 | 4/1957 | Canada | 423/605 |
| 1,140,183 | 11/1962 | Germany | 423/605 |

*Primary Examiner*—Herbert T. Carter
*Attorney, Agent, or Firm*—William G. Addison

[57] ABSTRACT

The present invention relates to an improved manganese dioxide. More particularly, the present invention relates to a method of improving the properties of electrolytic manganese dioxide for use as a depolarizer in primary cells. Broadly, the method comprises treating the electrolytic manganese dioxide in an aqueous treatment solution containing manganese ions and sulfuric acid.

10 Claims, No Drawings

PROCESS OF TREATING ELECTROLYTIC MANGANESE DIOXIDE

BACKGROUND OF THE INVENTION

The use of manganese dioxide as a depolarizer in a dry cell battery of the LeClanche or the magnesium can type is well known. Manganese dioxide used as a depolarizer in such cells may be formed of natural manganese dioxide ores. More recently, however, it has been suggested that certain activated manganese dioxides produce dry cells which have greater capacity than similar cells in which the depolarizer is formed of natural manganese dioxide ores.

It is known to produce battery grade manganese dioxide by reacting manganese with an alkali metal chlorate in the presence of sulfuric acid. In U.S. Pat. No. 2,956,860 it is suggested that such a method of producing manganese dioxide may be improved by carrying out the reaction in the presence of a catalytic amount of $MnO_2$ product produced by roasting precipitated manganese carbonate under oxidizing conditions.

It also is known to produce manganese dioxide by electrolytically oxidizing an aqueous solution of manganous ions. Manganese dioxide produced electrolytically generally consists predominantly of Gamma crystals. Further, electrolytically produced manganese dioxide usually is preferred over the others for use as a depolarizer in batteries. There still is need, however, for further improvement in the electrolytic properties of such manganese dioxide for use as a depolarizer.

SUMMARY OF THE INVENTION

The present invention provides a method of treating an electrodeposited manganese dioxide to improve its properties for use as a depolarizer in dry cells. Magnesium dioxide treated in accordance with the present method is suitable for use as a depolarizer in dry cells of either the LeClanche or magnesium can type.

Broadly, the method comprises treating the electrodeposited manganese dioxide in an aqueous solution containing manganous ions and sulfuric acid. The manganous ions must be present in an amount of at least 1 gram per liter of solution and the sulfuric acid must be present in an amount sufficient to provide a ratio of manganous ions to sulfuric acid of from about 1:10 to 2:1.

The concentration of manganese dioxide in the treatment solution is not critical and may range from about 150 to 1,500 grams per liter of solution. The manganese dioxide is admixed in the solution and treated at a temperature of from about 70°C. to about the boiling point of the admixture for a time of from about 2 to 10 hours. Preferably the admixture is agitated during at least a portion of the treatment time.

DESCRIPTION OF THE PREFERRED EMBODIMENT

The method of the present invention provides a method of treating manganese dioxide having a predominantly Gamma crystalline structure such as, for example, manganese dioxide produced electrolytically. In accordance with the present method electrodeposited manganese dioxide is admixed with an aqueous treatment solution to provide a slurry of manganese dioxide in the treatment solution. The treatment solution comprises an aqueous solution of manganous ions and sulfuric acid.

It is essential that the treatment solution contain at least about 1 gram of manganous ion per liter of solution and may contain up to about 150 grams per liter. The concentration of the sulfuric acid in the treatment solution is selected to provide a weight ratio of manganous ion to sulfuric acid of from about 1:10 to 2:1 and preferably from about 1:8 to 1:1. Particularly good results are obtained when the treatment solution contains from about 10 to 100 grams per liter of manganous ion and the ratio of manganous ion to sulfuric acid is from about 0.25:1 to 0.5:1.

The time of treatment and temperature may be widely varied, increase in temperature resulting in a shortening of the treatment time. The treatment time may range from 2 to 12 hours and the temperature from 70°C. to about the boiling point of the slurry. Preferably the temperature is maintained at about the boiling point of the slurry and the treatment time is maintained within the range of from about 5 to 8 hours. A treatment time much in excess of about 12 hours should be avoided, for it has been observed that manganese dioxide treated in accordance with the present method for such an excessive length of time undergoes a change from the desired Gamma crystal structure to a Beta crystal structure.

The mechanism by which manganese dioxide treated in accordance with the present method is improved is not understood. As shown in the following examples, however, batteries formulated from manganese dioxide treated in accordance with the present method have improved operating characteristics. Moreover, when manganese dioxide is treated in an aqueous solution that does not contain both manganous ions and sulfuric acid in accordance with the present method, no beneficial results are obtained.

EXAMPLE I

A quantity of a commercial electrolytic $MnO_2$ is obtained and divided into a number of samples. Thirty of the samples are treated in accordance with the method of the present invention. More particularly, the sample is mixed with an aqueous solution containing manganous ions and sulfuric acid. Each sample is treated for different periods of time and using various weight ratios of manganous ion ($Mn^{++}$) to sulfuric acid. During the treatment of each sample the temperature is maintained at about the boiling temperature of the aqueous mixture.

Using portions of each of the treated samples and a portion of the untreated $MnO_2$ a number of substantially identical LeClanche type dry cells are made. Each dry cell contains 0.5 grams $MnO_2$ mixed with 0.1 grams of Shawnigan black and moistened with standard LeClanche electrolyte. Each of the dry cells then is tested.

The test comprises connecting a dry cell to a variable resistance and monitoring the cell voltage and current flow. The variable resistor is adjusted to maintain a constant current drain on the cell of 63 ma and the time required for the cell voltage to decrease to 1.2, 1.1 and 1.0 volts respectively is measured. The results of the tests are as tabulated in Table I below. From those results, it is seen that the drain time to 1.0 volt is improved for all of the dry cells formulated from $MnO_2$ samples treated in accordance with the present invention.

TABLE I

| NUMBER | COMPOSITION TREATMENT SOLUTION | | LeClanche Rapid Discharge Test | | DRAIN TIME MINUTES TO | | |
|---|---|---|---|---|---|---|---|
| | Mn++gm/l | H₂SO₄gm/l | TIME HOURS | RATIO Mn++/H₂SO₄ | 1.2 volts | 1.1 volts | 1.0 volts |
| Untreated MnO$_2$ | — | — | — | — | 50 | 66 | 76 |
| 1A | 25 | 50 | 2 | 0.5 | 49 | 68 | 85 |
| 2A | 12.5 | 50 | 2 | 0.25 | 44 | 66 | 81 |
| 3A | 50 | 50 | 2 | 1.0 | 49 | 70 | 84 |
| 4A | 25 | 50 | 2 | 1.0 | 42 | 64 | 80 |
| 5A | 12.5 | 25 | 2 | 0.5 | 50 | 69 | 83 |
| 6A | 50 | 25 | 2 | 2.0 | 44 | 64 | 79 |
| 7A | 25 | 100 | 2 | 0.25 | 58 | 78 | 85 |
| 8A | 12.5 | 100 | 2 | 0.125 | 54 | 72 | 84 |
| 9A | 50 | 100 | 2 | 0.5 | 50 | 68 | 83 |
| 10A | 100 | 100 | 2 | 1.0 | 52 | 70 | 82 |
| 1B | 25 | 50 | 5 | 0.5 | 50 | 72 | 86 |
| 2B | 12.5 | 50 | 5 | 0.25 | 52 | 74 | 86 |
| 3B | 50 | 50 | 5 | 1.0 | 42 | 64 | 82 |
| 4B | 25 | 25 | 5 | 1.0 | 48 | 72 | 85 |
| 5B | 12.5 | 25 | 5 | 0.5 | 48 | 74 | 85 |
| 6B | 50 | 25 | 5 | 2.0 | 45 | 68 | 80 |
| 7B | 25 | 100 | 5 | 0.25 | 52 | 76 | 85 |
| 8B | 12.5 | 100 | 5 | 0.125 | 51 | 73 | 83 |
| 9B | 50 | 100 | 5 | 0.5 | 45 | 65 | 79 |
| 10B | 100 | 100 | 5 | 1.0 | 46 | 70 | 83 |
| 1C | 25 | 50 | 8 | 0.5 | 44 | 68 | 84 |
| 2C | 12.5 | 50 | 8 | 0.25 | 46 | 70 | 86 |
| 3C | 50 | 50 | 8 | 1.0 | 46 | 71 | 85 |
| 4C | 25 | 25 | 8 | 1.0 | 47 | 72 | 87 |
| 5C | 12.5 | 25 | 8 | 0.5 | 46 | 70 | 86 |
| 6C | 50 | 25 | 8 | 2.0 | 41 | 64 | 79 |
| 7C | 25 | 100 | 8 | 0.25 | 50 | 74 | 85 |
| 8C | 12.5 | 100 | 8 | 0.125 | 50 | 74 | 86 |
| 9C | 50 | 100 | 8 | 0.5 | 50 | 74 | 86 |
| 10C | 100 | 100 | 8 | 1.0 | 46 | 71 | 84 |

EXAMPLE II

Using additional portions of the thirty treated samples from Example I and another portion of the untreated manganese dioxide a number of substantially identical magnesium can batteries are made. Each battery then is tested for high drain discharge time. The test comprises connecting the selected battery to a 16.6 ohm resistor, monitoring the voltage and measuring the time required for the voltage to decline to 1.2, 1.1 and 1.0 volts respectively. To compensate for minor variations in the composition of each battery and provide a more meaningful basis for comparison, the measured time for discharge to a specific voltage is divided by the dry weight of manganese dioxide in the battery to obtain a discharge time, per gram of dry manganese dioxide, to the respective voltages. The values obtained from the test of each battery is tabulated in Table II below.

From the results tabulated in Table II the improved results obtained with MnO$_2$ treated in accordance with the present invention are readily seen. More particularly, all the batteries made with MnO$_2$ treated for 8 hours showed substantial improvement in drain time to 1.2, 1.1 and 1.0 volts. Most of the batteries made from MnO$_2$ treated for 5 hours showed improvement. Indeed, in several instances improvement is noted for batteries made from MnO$_2$ treated for only 2 hours.

TABLE II

| NUMBER | COMPOSITION TREATMENT SOLUTION | | TIME | RATIO | DRAIN TIME MINUTES TO | | |
|---|---|---|---|---|---|---|---|
| | Mn++gm/l | H₂SO₄gm/l | | Mn++/H₂SO₄ | 1.2 volts | 1.1 volts | 1.0 volts |
| Untreated MnO$_2$ | — | — | — | — | 1.78 | 1.94 | 2.21 |
| 1A | 25 | 50 | 2 | 0.5 | 1.96 | 2.06 | 2.19 |
| 1B | 25 | 50 | 5 | 0.5 | 1.99 | 2.13 | 2.22 |
| 1C | 25 | 50 | 8 | 0.5 | 2.05 | 2.18 | 2.34 |
| 2A | 12.5 | 50 | 2 | 0.25 | 1.78 | 1.91 | 2.18 |
| 2B | 12.5 | 50 | 5 | 0.25 | 1.83 | 1.96 | 2.20 |
| 2C | 12.5 | 50 | 8 | 0.25 | 1.93 | 2.12 | 2.27 |
| 3A | 50 | 50 | 2 | 1.0 | 1.91 | 2.02 | 2.16 |
| 3B | 50 | 50 | 5 | 1.0 | 1.97 | 2.11 | 2.32 |
| 3C | 50 | 50 | 8 | 1.0 | 2.07 | 2.19 | 2.35 |
| 4A | 25 | 25 | 2 | 1.0 | 1.75 | 1.86 | 2.06 |
| 4B | 25 | 25 | 5 | 1.0 | 1.95 | 2.12 | 2.31 |
| 4C | 25 | 25 | 8 | 1.0 | 2.07 | 2.17 | 2.35 |
| 5A | 12.5 | 25 | 2 | 0.5 | 1.96* | 1.91 | 2.18 |
| 5B | 12.5 | 25 | 5 | 0.5 | 1.82 | 1.99 | 2.21 |
| 5C | 12.5 | 25 | 8 | 0.5 | 1.99 | 2.15 | 2.38 |
| 6A | 50 | 25 | 2 | 2.0 | 1.84 | 1.96 | 2.11 |
| 6B | 50 | 25 | 5 | 2.0 | 1.93 | 2.06 | 2.20 |
| 6C | 50 | 25 | 8 | 2.0 | 2.09 | 2.19 | 2.29 |
| 7A | 25 | 100 | 2 | 2.0 | 1.85 | 1.94 | 2.14 |
| 7B | 25 | 100 | 5 | 2.0 | 1.91 | 2.06 | 2.22 |
| 7C | 25 | 100 | 8 | 2.0 | 2.07 | 2.19 | 2.28 |
| 8A | 12.5 | 100 | 2 | 0.125 | 1.94 | 2.01 | 2.10 |
| 8B | 12.5 | 100 | 5 | 0.125 | 1.90 | 2.01 | 2.16 |
| 8C | 12.5 | 100 | 8 | 0.125 | 2.07 | 2.19 | 2.29 |

Table II—Continued

| NUMBER | COMPOSITION TREATMENT SOLUTION | | TIME | RATIO | DRAIN TIME MINUTES TO | | |
|---|---|---|---|---|---|---|---|
| | Mn++ gm/l | $H_2SO_4$ gm/l | | Mn++/$H_2SO_4$ | 1.2 volts | 1.1 volts | 1.0 volts |
| 9A | 50 | 100 | 2 | 0.5 | 1.83 | 1.94 | 2.10 |
| 9B | 50 | 100 | 5 | 0.5 | 1.97 | 2.09 | 2.20 |
| 9C | 50 | 100 | 8 | 0.5 | 2.14 | 2.24 | 2.38 |
| 10A | 100 | 100 | 2 | 1.0 | 1.83 | 1.92 | 2.14 |
| 10B | 100 | 100 | 5 | 1.0 | 2.01 | 2.12 | 2.22 |
| 10C | 100 | 100 | 8 | 1.0 | 2.04 | 2.14 | 2.27 |

*Probably experimental error.

What is claimed is:

1. A method of treating electrodeposited manganese dioxide comprising:
   a. providing an admixture comprising manganese dioxide in an aqueous treatment solution of sulfuric acid and manganous ion, said manganous ion being present in an amount of at least 1 gram per liter of solution, said sulfuric acid being present in an amount sufficient to provide a ratio of manganous ion to sulfuric acid of from 1:10 to 2:1 and said manganese dioxide being present in an amount of from about 150–1,500 gram per liter of solution;
   b. maintaining said admixture at a treatment temperature of from about 70°C. to about the boiling point of the admixture for a time of from 2 to 10 hours;
   c. agitating said admixture during at least a portion of the time it is maintained at said treatment temperature; and
   d. recovering the treated manganese dioxide.

2. A method as set forth in claim 1 wherein said manganous ion is present in an amount of from about 10 to 100 grams per liter of treatment solution.

3. A method as set forth in claim 1 wherein said ratio of manganous ion to sulfuric acid is from about 1:8 to 1:1.

4. A method as set forth in claim 1 wherein the treatment temperature is about the boiling point of the admixture.

5. A method as set forth in claim 1 wherein the treatment time is from about 5 to 8 hours.

6. A method as set forth in claim 1 wherein the treatment solution consists essentially of an aqueous solution of manganous ion and sulfuric acid, said manganous ion being present in an amount of from about 10 to 100 grams per liter of solution and said sulfuric acid being present in an amount sufficient to provide a ratio of manganous ion to acid ratio of from about 1:8 to 1:1.

7. A method as set forth in claim 6 wherein the treatment temperature is about the boiling point of the admixture.

8. A method as set forth in claim 7 wherein the treatment time is from about 5 to 8 hours.

9. A method as set forth in claim 8 wherein said admixture is continuously agitated during the time it is maintained at the treatment temperature.

10. A method as set forth in claim 9 wherein the ratio of manganous ion to sulfuric acid is from about 0.25:1 0.5:1.

* * * * *